United States Patent

Kubota et al.

[11] 3,757,610
[45] Sept. 11, 1973

[54] CONTROL SYSTEM FOR GAS TURBINE ENGINE

[75] Inventors: Seishi Kubota, Yokosuka; Takashi Kunugi, Yokohama; Tetsuo Katsume, Yokosuka, all of Japan

[73] Assignee: Nissan Motor Company, Limited, Yokohama City, Japan

[22] Filed: July 23, 1971

[21] Appl. No.: 165,048

[30] Foreign Application Priority Data
Sept. 17, 1970 Japan.................................. 45/81509

[52] U.S. Cl.................. 74/843, 60/39.17, 60/39.25, 74/866, 74/DIG. 5
[51] Int. Cl........................... B60k 21/00, F02c 9/02
[58] Field of Search...................... 74/866, 843, 861, 74/DIG. 5; 60/39.17, 39.25

[56] References Cited
UNITED STATES PATENTS

| | | | |
|---|---|---|---|
| 3,523,423 | 8/1970 | Young......................... | 60/39.16 R X |
| 3,439,564 | 4/1969 | Scholl et al.......................... | 74/866 |
| 2,953,940 | 9/1960 | Slemmons........................ | 74/DIG. 5 |
| 3,300,966 | 1/1967 | Chadwick ...................... | 60/39.25 X |
| 3,367,106 | 2/1968 | Robinson.......................... | 74/DIG. 5 |
| 3,529,419 | 9/1970 | Reed.............................. | 60/39.25 X |
| 3,626,254 | 12/1971 | Kawakubo et al................ | 74/866 X |
| 3,646,835 | 3/1972 | Ito et al. ........................... | 74/866 X |
| 3,656,301 | 4/1972 | Katz............................ | 60/39.16 R X |

*Primary Examiner*—Charles J. Myhre
*Assistant Examiner*—Thomas C. Perry
*Attorney*—Robert E. Burns et al.

[57] ABSTRACT

A control system is disclosed for a vehicle gas turbine engine having a power turbine driving a power transmission of a motor vehicle on which the gas turbine engine is mounted, an adjustable nozzle which is positioned relative to the power turbine, and a combustor, wherein a flow of fuel to the combustor, an angular position of the adjustable nozzle relative to the power turbine and a fluid pressure controlling a gear train control system of the power transmission are concurrently regulated electrically in accordance with a variation of the selected position and accordingly of the opening degree of an accelerator pedal.

5 Claims, 6 Drawing Figures

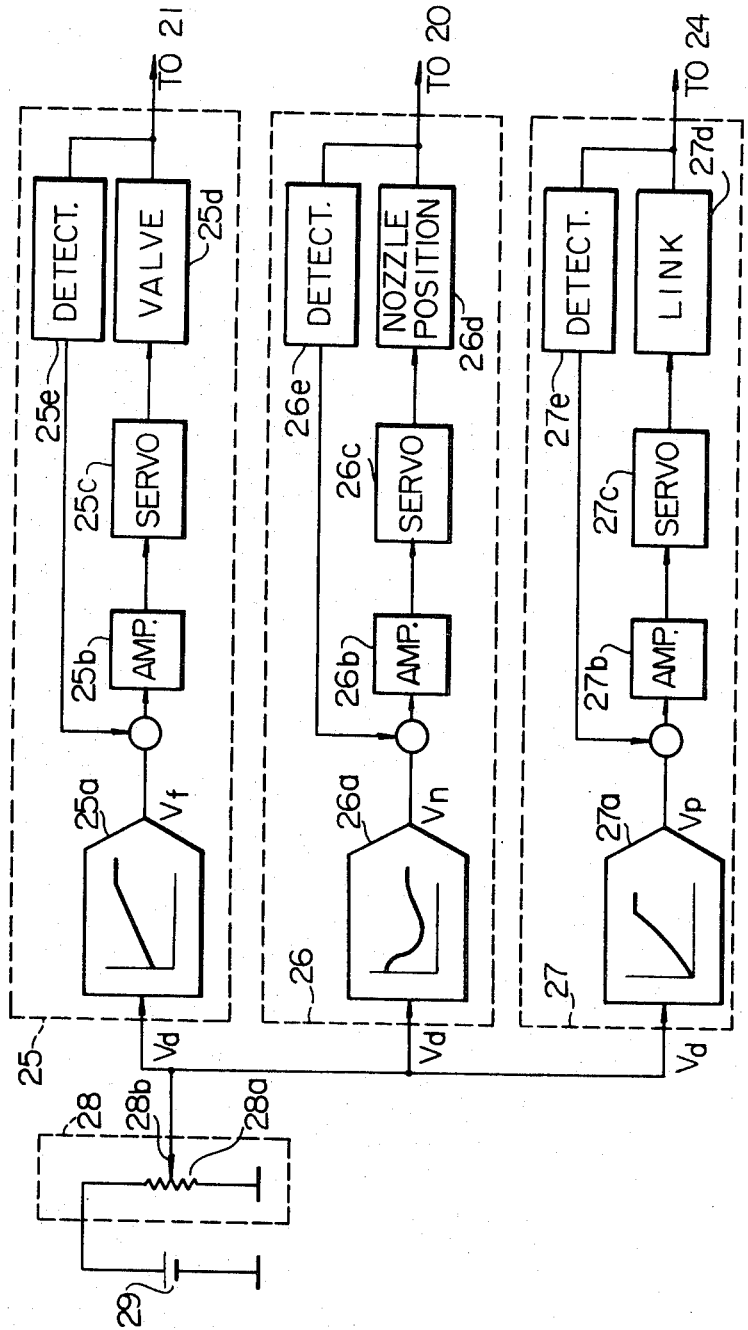

CONTROL SYSTEM FOR GAS TURBINE ENGINE

This invention relates to a gas turbine engine and, more particularly, to a control system of the gas turbine engine.

The gas turbine engine to which this invention is directed is used as a prime mover of a motor vehicle and operates in association with an accelerator pedal and an automatic power transmission system. Such gas turbine engine per se is well known in the art and includes a combustor, a power turbine, an adjustable nozzle positioned relative to the power turbine and a power sensing linkage which is associated with the power transmission system. The power sensing linkage is adapted to regulate the fluid pressure in a hydraulic control circuit of the power transmission.

The flow of the fuel to the combustor, the angle at which the adjustable nozzle is positioned relative to the power turbine and the movement of the power sensing linkage are commonly regulated in terms of a selected position of the accelerator pedal by the aid of mechanical control arrangements or hydraulic or pneumatic control systems or by combinations thereof. Regulation of these mutually delicately related operational variables is not fully acceptable for exactly and sensitively following the varying positions of the accelerator pedal. This invention thus contemplates provision of a solution to this problem and an important object of the invention is to provide an improved control system adapted to reliably and minutely regulate the above noted operational variables in accordance with the selected positions of the accelerator pedal so that the gas turbine engine operates at all times in those conditions which are optimum for the accelerator positions.

In the drawings:

FIG. 2 is a block diagram illustrating a preferred embodiment of the control system.

Figure 1:
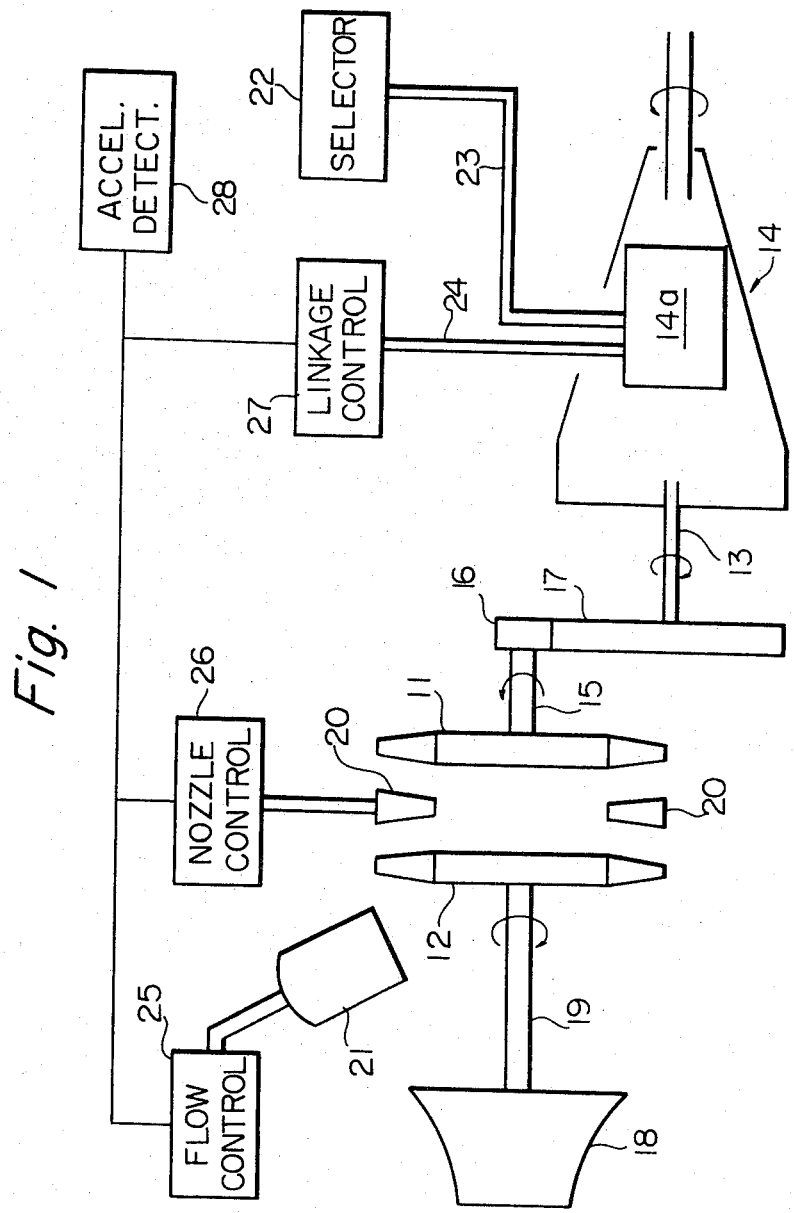
FIG. 1 is a diagrammatic view showing an overall construction of a gas turbine engine into which the control system according to this invention is incorporated.
Figure 3A:
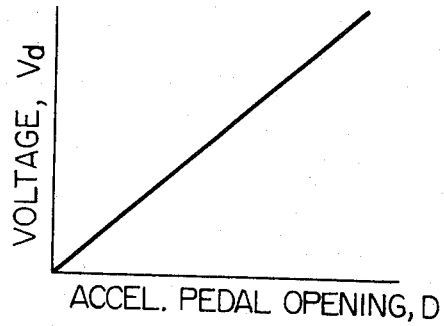
FIGS. 3a, 3b, 3c and 3d are views showing waveforms of signal voltages used in the control system shown in FIG. 2.
Figure 3B:
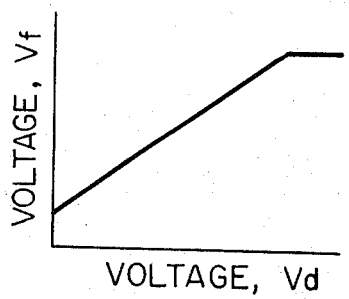
Figure 3C:
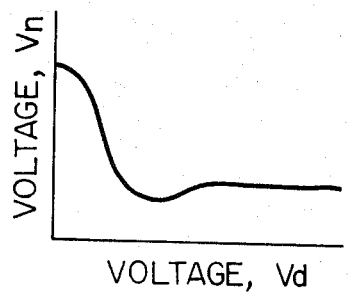
Figure 3D:
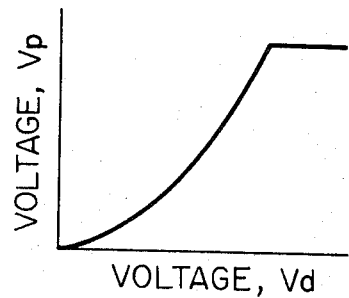

Reference is first made to FIG. 1, in which the gas turbine engine is diagrammatically shown to include power and compressor turbines 11 and 12, respectively. The power turbine 11 is connected to a drive shaft 13 of an automatic power transmission 14 through a shaft 15 and reduction gears 16 and 17. The compressor turbine 12, on the other hand, is connected to a compressor 18 through a shaft 19.

An adjustable nozzle 20 is positioned relative to the power and compressor turbines 11 and 12, respectively. The angle of the adjustable nozzle 20 with respect to the turbines 11 and 12 can be varied so as to change the relative rotational speeds of the two turbines. A combustor 21 burns a mixture of air and fuel to drive the power and compressor turbines 11 and 12, respectively.

The power transmission 14 includes a gear train (not shown) and a hydraulic control system 14a for selecting gear ratios in the gear train. The gear train control system 14a is connected to and operated by a vehicle speed selector 22 through a linkage 23 whereby a gear ratio corresponding to a vehicle speed manually selected in the selector 22 is established in the power transmission 14. The gear train control system 14a is also connected to a power sensing linkage 24 through its hydraulic control unit (not shown) so as to control the hydraulic gear train control system 14a in relation to the movement of an accelerator pedal (not shown).

The gas turbine engine shown in FIG. 1 per se is well known in the art and, as such, no detailed discussion of the construction and operation thereof is herein incorporated.

The flow of the mixture to the combustor 21, the angle of the adjustable nozzle 20 relative to the turbines 11 and 12, and the relative position of the power sensing linkage 24 are all regulated in accordance with the selected position of the accelerator pedal so that the gas turbine engine can operate in conditions following the accelerator pedal positions.

To achieve this purpose, the combustor 21, adjustable nozzle 20 and power sensing linkage 24 are operatively connected to and controlled by respective control means 25, 26 and 27. These means 25, 26 and 27 are electrically connected to a common accelerator pedal position detector 28 detecting a selected position of the accelerator pedal during operation. The control means 25 is adapted to regulate the flow of the fuel to the combustor 21 and the control means 26 is adapted to regulate the angle at which the adjustable nozzle 20 is positioned relative to the turbines 11 and 12, whereby the relative rotational speeds of the turbines 11 and 12 are regulated in accordance with the selected accelerator pedal position. The control means 27, on the other hand, is adapted to regulate the movement of the power sensing linkage 24, controlling the hydraulic gear train control system 14a to shift the gear ratios to meet the accelerator pedal requirement. This control means 27 is usually located in an automatic power transmission so as to determine the driving power required for the selected position of the accelerator pedal (or otherwise the selected angular position of a carburetor throttle valve) for regulating the movement of the power sensing linkage. The movement of the power sensing linkage is transferred to the hydraulic control unit of the transmission thereby to establish a gear ratio appropriate for the detected accelerator pedal position.

A preferred electrical arrangement of the control system which is thus made up of the fuel flow control means 25, the adjustable nozzle control means 26, the power sensing linkage control means 27 and the accelerator pedal position detector 28 is illustrated in FIG. 2.

Referring to FIG. 2, the accelerator pedal position detector 28 is shown to comprise a rheostat 28a having a sliding arm 28b which is moved in relation to the movement of the accelerator pedal. The detector 28 is connected to a source 29 of electric power and produces a signal voltage $V_d$ which is substantially proportional to the opening degree D of the accelerator pedal, as indicated in (a) of FIG. 3. The signal voltage $V_d$ delivered from the accelerator position detector 28 is distributed to the fuel flow control means 25, adjustable nozzle control means 26 and power sensing linkage control means 27. These control means 25, 26 and 27 have respective function generators 25a, 26a and 27a which are constructed to convert the input voltage $V_d$ into respective signal voltages $V_f$, $V_n$ and $V_p$ with different waveforms and which comprise predetermined operating programs. The waveforms of the signal voltages produced by the function generators 25a, 26a and 27a are predetermined so as to meet the respective operation requirements of the combustor 21, adjustable nozzle 20 and power sensing linkage 24 (FIG. 1), examples of such waveforms being illustrated in (b), (c) and (d) of FIG. 3.

The function generators 25a, 26a and 27a are connected respectively to amplifiers 25b, 26b and 27b whereby the output voltages $V_f$, $V_n$ and $V_p$ of the function generators are amplified.

The amplifier 25b of the fuel flow control means 25 is connected through servo means such as a servo motor 25c to a fuel flow regulator valve 25d regulating the flow of the fuel to the combustor 21 in accordance with the predetermined characteristics of the voltage $V_f$ produced by the function generator 25a. The amplifier 26b of the adjustable nozzle control means 26 is connected through servo means such as a servo cylinder 26c to a regulator 26d whereby the angular position of the adjustable nozzle 20 is varied relative to the power and compressor turbines 11 and 12, respectively, to meet the characteristics of the voltage $V_n$ produced by the function generator 26a. The amplifier 27b of the power sensing linkage control means 27, on the other hand, is connected through servo means such as a servo cylinder 27c to a linkage regulator 27d adapted to regulate the displacement of the power sensing linkage 24 (FIG. 1) so as to control the hydraulic gear train control unit 14a.

The outputs from the flow regulator valve 25d, the nozzle positioner 26d and the linkage regulator 27d may preferably be converted into signal voltages and fed back to summing points located ahead of the associated amplifiers 25b, 26b and 27b, respectively, through a fuel flow sensor 25e, a nozzle position sensor 26e and a linkage displacement sensor 27e, respectively.

The flow of the fuel to the combustor 21, angular position of the adjustable nozzle 20 and movement of the power sensing linkage 24 are thus regulated in accordance with the selected opening degree of the accelerator pedal.

The accelerator pedal position detector 28 and the function generators 25a, 26a and 27a may preferably use electronic elements so as to provide increased response, to facilitate determination, re-adjustment and-/or modification of the characteristics of the signal voltages to be used in the control system and to save the accelerator pedal from a mechanical load which may otherwise add to the pressing effort by a vehicle driver.

What is claimed is:

1. In a motor vehicle having a power transmission which includes a gear train control system controlled by a power sensing linkage, an automotive gas turbine engine having a power turbine connected to drive said power transmission, a compressor turbine, an adjustable nozzle adjustably positionable relative to said power and compressor turbines, a combustor and a depressible accelerator pedal, a control system comprising: detecting means connected to said accelerator pedal for producing a signal voltage substantially proportional to the degree of depression of said accelerator pedal, said detecting means comprising an electric circuit having a constant voltage source and a rheostat; fuel flow control means responsive to said signal voltage for regulating the flow of fuel to said combustor; nozzle control means responsive to said signal voltage for regulating the angle at which said adjustable nozzle is positioned relative to said power and compressor turbines; and power sensing linkage control means connected to said power sensing linkage and responsive to said signal voltage for regulating the displacement of said power sensing linkage for controlling said gear train control system.

2. A control system according to claim 1, wherein said detecting means includes a sliding arm slidable on said rheostat and connected to said accelerator pedal.

3. A control system according to claim 1, wherein each of said fuel flow, nozzle and power sensing linkage control means comprises a function generator connected to said detecting means and operative to convert said signal voltage into another signal voltage having a predetermined operating characteristic determined in relation to its associated control means, an amplifier connected to said function generator, a servo means connected to said amplifier, a regulator connected to said servo means for regulating each of said flow, angle and displacement by a signal supplied from said servo means, and means for sensing the output of said regulator and feeding back a signal representing the output to said amplifier.

4. In a motor vehicle having a power turbine connected to a variable speed transmission, an adjustable nozzle adjustably positionable relative to said power turbine, a combustor for receiving therein a combustible fuel mixture for burning same and delivering the combustion products to said adjustable nozzle and a variably positionable accelerator pedal operated during use of the motor vehicle by a motor vehicle operator, a control system for controlling the motor vehicle in dependence upon the position of said accelerator pedal comprising: detecting means for detecting the position of said accelerator pedal and producing a corresponding output signal independently of the motor vehicle speed; nozzle control means responsive to said output signal for controlling the flow rate of fuel to said combustor in accordance with a predetermined program; and transmission control means responsive to said output signal for controlling the speed of said transmission in accordance with a predetermined program.

5. A motor vehicle according to claim 4; wherein said detecting means comprises a constant voltage source; and a rheostat connected to said constant voltage source, said rheostat having a resistor connected in series with said constant voltage source and a slidable contact arm connected to said accelerator pedal for movement therewith and slidable along said resistor to produce a variable output signal in dependence upon the position of said accelerator pedal.

* * * * *